United States Patent
Yang et al.

(10) Patent No.: US 11,742,915 B2
(45) Date of Patent: Aug. 29, 2023

(54) METHOD AND APPARATUS FOR INFORMATION PROCESSING, TERMINAL, AND COMMUNICATIONS DEVICE

(71) Applicant: VIVO MOBILE COMMUNICATION CO., LTD., Guangdong (CN)

(72) Inventors: Yu Yang, Chang'an Dongguan (CN); Peng Sun, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 49 days.

(21) Appl. No.: 17/094,728

(22) Filed: Nov. 10, 2020

(65) Prior Publication Data

US 2021/0067222 A1 Mar. 4, 2021

Related U.S. Application Data

(63) Continuation of application No. PCT/CN2019/085811, filed on May 7, 2019.

(30) Foreign Application Priority Data

May 11, 2018 (CN) .......................... 201810446949.2

(51) Int. Cl.
*H04B 7/06* (2006.01)
*H04W 24/10* (2009.01)
(Continued)

(52) U.S. Cl.
CPC ......... *H04B 7/0626* (2013.01); *H04B 7/0617* (2013.01); *H04W 72/0446* (2013.01); *H04W 72/21* (2023.01); *H04W 72/53* (2023.01)

(58) Field of Classification Search
CPC .... H04B 7/0626; H04B 7/0617; H04B 7/063; H04B 7/0695; H04W 72/0413; H04W 72/0446; H04W 72/0493; H04W 24/10
See application file for complete search history.

(56) References Cited

U.S. PATENT DOCUMENTS

| | | | |
|---|---|---|---|
| 10,979,917 B2* | 4/2021 | Luo | ........................ H04W 24/04 |
| 2016/0295573 A1* | 10/2016 | Lee | ........................ H04W 72/21 |

(Continued)

FOREIGN PATENT DOCUMENTS

| | | |
|---|---|---|
| CN | 101312408 A | 11/2008 |
| CN | 103391575 A | 11/2013 |

(Continued)

OTHER PUBLICATIONS

EP Search Report in Application No. 19799950.1 dated May 19, 2021.

(Continued)

*Primary Examiner* — Harry H Kim
(74) *Attorney, Agent, or Firm* — Maschoff Brennan (57) ABSTRACT

An information processing method and apparatus, a terminal, and a communication device are provided in the embodiments of the present disclosure. The information processing method includes: reporting a beam report and/or a channel status information (CSI) report to a network side device, where the beam report and/or the CSI report is reported in a case that time domain behavior of the beam report and/or the CSI report is periodic or semi-persistent and a report condition is met, or the beam report and/or the CSI report is reported in a case that the time domain behavior of the beam report and/or the CSI report is an aperiodic report.

15 Claims, 2 Drawing Sheets

(51) Int. Cl.
*H04W 72/0446* (2023.01)
*H04W 72/21* (2023.01)
*H04W 72/53* (2023.01)

(56) References Cited

U.S. PATENT DOCUMENTS

| | | | |
|---|---|---|---|
| 2018/0007686 A1 | 1/2018 | Lyu | |
| 2018/0083722 A1* | 3/2018 | Reial | H04B 17/382 |
| 2019/0207662 A1* | 7/2019 | Zhou | H04W 24/08 |
| 2019/0319739 A1* | 10/2019 | Kang | H04W 72/0446 |
| 2020/0128533 A1* | 4/2020 | Li | H04L 5/0091 |
| 2020/0204239 A1* | 6/2020 | Kang | H04B 7/0456 |
| 2020/0228282 A1* | 7/2020 | Kwak | H04L 1/00 |
| 2020/0287683 A1* | 9/2020 | Kwak | H04L 1/08 |
| 2020/0295894 A1* | 9/2020 | Kang | H04L 5/0078 |
| 2020/0314711 A1* | 10/2020 | Basu Mallick | H04W 36/08 |
| 2020/0358504 A1* | 11/2020 | Takeda | H04B 7/0626 |
| 2020/0367249 A1* | 11/2020 | Suzuki | H04W 72/23 |
| 2020/0404668 A1* | 12/2020 | Nakamura | H04L 1/0072 |
| 2021/0195597 A1* | 6/2021 | Wu | H04B 7/0626 |

FOREIGN PATENT DOCUMENTS

| | | |
|---|---|---|
| CN | 103546207 A | 1/2014 |
| CN | 103580794 A | 2/2014 |
| CN | 103929267 A | 7/2014 |
| CN | 107135025 A | 9/2017 |
| WO | 2016149864 A1 | 9/2016 |

OTHER PUBLICATIONS

"Beam management and beam reporting" 3GPP TSG RAN WG1 Meeting #90, R1-1712836, vivo, Aug. 21, 2017.
"CSI framework for NR" 3GPP TSG RAN WG1 NR#90bis Meeting, R1-1718415, Sharp, Oct. 9, 2017.
"RAN2 implications from CSI-RS acquisition, beam managements and L3 mobility", 3GPP TSG RAN NR Ad-Hoc, R2-1707053, Intel Corporation, Jun. 27, 2017.
CN Office Action in Application No. 201810446949.2 dated Sep. 2, 2020.
"UCI contents and UL control channel formats" Intel Corporation, 3GPP TSG-RAN WG1 #86bis, R1-1609536, Oct. 10, 2016.
"Summary of remaining issues on CSI measurement" ZTE, Sanechips, 3GPP TSG RAN WG1 Meeting AH1801, R1-1801183, Jan. 22, 2018.
Written Opinion and International Search Report in Application No. PCT/CN2019/085811 dated Nov. 26, 2020.

\* cited by examiner

METHOD AND APPARATUS FOR INFORMATION PROCESSING, TERMINAL, AND COMMUNICATIONS DEVICE

CROSS-REFERENCE TO RELATED APPLICATIONS

This application is a continuation application of International Application No. PCT/CN2019/085811 filed on May 7, 2019, which claims priority to Chinese patent application No. 201810446949.2 filed in China on May 11, 2018, both disclosures of which are incorporated herein by reference in their entireties.

TECHNICAL FIELD

Embodiments of the present disclosure relate to the field of communications technologies, and in particular, to a method and an apparatus for information processing, a terminal, and a communications device.

BACKGROUND

Radio access technology standards such as Long Term Evolution (Long Term Evolution, LTE)/LTE-Advanced (LTE-Advanced, LTE-A) are constructed on the basis of technologies such as Multiple-Input Multiple-Output (Multiple-Input Multiple-Output, MIMO) and Orthogonal Frequency Division Multiplexing (Orthogonal Frequency Division Multiplexing, OFDM). The MIMO technology uses a degree of spatial freedom obtained by a multi-antenna system to improve a peak rate and a system spectrum utilization rate. It may be predicted that the MIMO technology with a larger scale and more antenna ports will be introduced in a future 5G mobile communications system.

The massive (Massive) MIMO technology uses a large-scale antenna array, which can greatly improve system frequency band utilization efficiency and support more access users. Therefore, major research organizations regard the Massive MIMO technology as one of most promising physical layer technologies in a next-generation mobile communications system.

In the Massive MIMO technology, in a case that a full digital array is used, a maximized spatial resolution and an optimal MU-MIMO performance can be implemented, but this structure requires a large number of analog-digital (analog-digital, AD)/digital-analog (digital-analog, DA) conversion devices and a large number of complete radio frequency-baseband processing channels, causing a huge burden on both device cost and baseband processing complexity.

To avoid the foregoing implementation cost and device complexity, a digital-analog hybrid beamforming technology emerges, that is, on the basis of the digital domain beamforming in the related technologies, a first-stage beamforming is added, near a front end of an antenna system, to a radio frequency signal. The analog beamforming can achieve a rough match between a transmitted signal and a channel in a relatively simple way. Dimension of an equivalent channel formed by the analog beamforming is smaller than an actual quantity of antennas, so that subsequent required AD/DA conversion devices, the quantity of digital channels, and the corresponding baseband processing complexity can be greatly reduced. Residual interferences from the analog beamforming can be processed again in a digital domain to ensure quality of Multi-User Multiple-Input Multiple-Output (Multi-User Multiple-Input Multiple-Output, MU-MIMO) transmission.

The analog beamforming is of full-bandwidth transmission, and each polarization direction array element on a panel of each high-frequency antenna array can transmit an analog beam only in a time-division multiplexing mode. A weight of the analog beamforming is implemented by adjusting parameters of devices such as a radio frequency front-end phase shifter. At present, a polling method is usually used to train analog beamforming vectors, that is, the array element, on each polarization direction, of each antenna panel sends a training signal (that is, a candidate beamforming vector) in turn at an appointed time in a time division multiplexing mode, a terminal feeds back a beam report after measurement, so that a network side device can use a beamforming vector used by the training signal to implement simulated beam transmission during a next service transmission.

The network side device configures beam reporting (beam reporting) setting information for a terminal through using high-layer signaling, that is, reporting setting, which includes content information of a beam report, time domain related messages of the beam report (periodic, aperiodic, semi-persistent), frequency granularity (frequency granularity) information of the beam report, and the like. The content information of the beam report may include identification information of at least one optimal transmitted beam selected by the terminal, physical layer measurement results of the beam selected by the terminal, grouping information of the beam selected by the terminal, and the like.

In the related technologies, reporting of the beam report is taken as an example, for a periodic and semi-persistent beam report, once the network side device configures related information of the beam report, the terminal needs to periodically report the beam report, or periodically report the beam report after an activation command is received; and for an aperiodic beam report, the terminal also requires to report one or more beam reports based on the trigger of the network side device.

However, when the state of the terminal does not change (for example, static) or has few changes (for example, moving speed is very slow), beam measurement results of the terminal do not change, that is, the beam report obtained from the current measurement does not change compared with a beam report that has been reported. Then, the terminal reporting the beam report at this time may cause communication resource waste. Likewise, a same problem exists in reporting of a channel state information (Channel State Information, CSI) report.

SUMMARY

Embodiments of the present disclosure provide a method and an apparatus for information processing, a terminal, and a communications device, to resolve a problem of communication resource waste caused by the terminal reporting a beam report or a CSI report in a case that a state of the terminal does not change or has few changes.

According to a first aspect, an embodiment of the present disclosure provides a method for information processing, applied to a terminal, including:

reporting a beam report and/or a channel state information CSI report to a network side device, where the beam report and/or the CSI report is reported in a case that time domain behavior of the beam report and/or the CSI report is a periodic report or a semi-persistent report and a reporting condition is met; or the beam report and/or the CSI report is reported in a case that time domain behavior of the beam report and/or the CSI report is an aperiodic report, where a quantity of reported beam reports is less than a quantity of beam reports that are configured by the network side device or triggered to report, and/or a quantity of reported CSI reports is less than a quantity of CSI reports that are configured by the network side device or triggered to report.

According to a second aspect, an embodiment of the present disclosure further provides a method for information processing, applied to a network side device, including:

receiving a beam report and/or a CSI report from a terminal, where the beam report and/or the CSI report is reported by the terminal in a case that time domain behavior of the beam report and/or the CSI report is a periodic report or a semi-persistent report and a reporting condition is met; or the beam report and/or the CSI report is reported by the terminal in a case that time domain behavior of the beam report and/or the CSI report is an aperiodic report, where a quantity of beam reports reported by the terminal is less than a quantity of beam reports that are configured by the network side device or triggered to report, and/or a quantity of CSI reports reported by the terminal is less than a quantity of CSI reports that are configured by the network side device or triggered to report.

According to a third aspect, an embodiment of the present disclosure further provides a terminal, including:

a reporting module, configured to report a beam report and/or a channel state information CSI report to a network side device, where the beam report and/or the CSI report is reported in a case that time domain behavior of the beam report and/or the CSI report is a periodic report or a semi-persistent report and a reporting condition is met; or the beam report and/or the CSI report is reported in a case that time domain behavior of the beam report and/or the CSI report is an aperiodic report, where a quantity of reported beam reports is less than a quantity of beam reports that are configured by the network side device or triggered to report, and/or a quantity of reported CSI reports is less than a quantity of CSI reports that are configured by the network side device or triggered to report.

According to a fourth aspect, an embodiment of the present disclosure further provides an apparatus for information processing, including:

a receiving module, configured to receive a beam report and/or a CSI report from a terminal, where the beam report and/or the CSI report is reported by the terminal in a case that time domain behavior of the beam report and/or the CSI report is a periodic report or a semi-persistent report and a reporting condition is met; or the beam report and/or the CSI report is reported by the terminal in a case that time domain behavior of the beam report and/or the CSI report is an aperiodic report, where a quantity of beam reports reported by the terminal is less than a quantity of beam reports that are configured by the network side device or triggered to report, and/or a quantity of CSI reports reported by the terminal is less than a quantity of CSI reports that are configured by the network side device or triggered to report.

According to a fifth aspect, an embodiment of the present disclosure further provides a communications device, including: a memory, a processor, and a computer program that is stored in the memory and capable of running on the processor, where the computer program, when executed by the processor, implements steps of the method for information processing according to the first aspect, or steps of the method for information processing according to the second aspect.

According to a sixth aspect, an embodiment of the present disclosure further provides a computer readable storage medium, where the computer readable storage medium stores a computer program, and the computer program, when executed by a processor, implements steps of the method for information processing according to the first aspect, or steps of the method for information processing according to the second aspect.

In this way, in the embodiments of the present disclosure, the terminal uses different methods to report the beam report and/or the CSI report to the network side device under different time domain behaviors, thereby saving communication resources.

BRIEF DESCRIPTION OF DRAWINGS

To better clarify the technical solution of the embodiments of the present disclosure, the accompanying drawings required to illustrate the embodiments of the present disclosure will be simply described below. Obviously, the accompanying drawings described below merely illustrate some embodiments of the present disclosure. Those ordinarily skilled in the art can obtain other accompanying drawings without creative efforts on the basis of those accompanying drawings.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In research of a next-generation communications system after 4G, an operating frequency band supported by the system is increased to 6 GHz or above, up to about 100 GHz. A high frequency band has relatively abundant idle frequency resources, and can provide greater throughput for data transmission. Currently, 3GPP has completed high frequency channel modeling work. A wavelength of a high frequency signal is shorter, compared with a low frequency band, more antenna arrays can be arranged on same-size panels, and beamforming technology is used to form a beam with a stronger directivity and a narrower lobe. Therefore, it also is one of the future trends to combine large-scale antennas with high frequency communication.

For beam measurement and beam reporting (beam measurement and beam reporting), the analog beamforming is of full-bandwidth transmission, and each polarization direction array element on a panel of each high-frequency antenna array can transmit an analog beam only in a time-division multiplexing mode. A weight of the analog beamforming is implemented by adjusting parameters of devices such as a radio frequency front-end phase shifter.

In current academia and industry, a polling method is usually used to train analog beamforming vectors, that is, the array element, on each polarization direction, of each antenna panel sends a training signal (that is, a candidate beamforming vector) at an appointed time in a time division multiplexing mode, a terminal feeds back a beam report after measurement, so that a network side device can use a beamforming vector used by the training signal to implement simulated beam transmission during a next service transmission. Content of a beam report usually includes several optimal transmitted beam identifiers and received power of each transmitted beam that is measured.

The network side device configures beam reporting (beam reporting) setting information for a terminal through using high-layer signaling, that is, reporting setting, which includes content information of a beam report, time domain related messages of the beam report (periodic, aperiodic, semi-persistent), frequency granularity (frequency granularity) information of the beam report, and the like. The content information of the beam report may include identification information of at least one optimal transmitted beam selected by the terminal, physical layer measurement results of the beam selected by the terminal, grouping information of the beam selected by the terminal, and the like. The specific descriptions are as follows.

Channel state information (Channel State Information, CSI) may include a channel quality indicator (Channel Quality Indicator, CQI), a precoding matrix indicator (Precoding Matrix Indicator, PMI), a CSI-RS resource indicator (CSI-RS resource indicator), a layer indicator (layer indicator, LI), a rank indicator (rank indicator, RI), and a layer 1 reference signal received power (layer 1 reference signal receiving power, L1-RSRP). Different CSI information is required to be reported for beam reports and CSI reports.

Each piece of setting information (a high-layer parameter CSI-Report Config) is associated with a downlink bandwidth part (Bandwidth part, BWP) and contains a series of reporting parameters, such as CSI type (CSI Type) (I or II), codebook configuration (including codebook subset restriction (codebook subset restriction)), time domain behavior, frequency domain granularity of the CQI and PMI, measurement restriction configurations (measurement restriction configurations), LI, L1-RSRP parameters, CSI-RS resource indicators (CSI-RS resource indicator, CRI), SSB resource indicators (SSB resource indicator, SSBRI), and the like.

The time domain behavior of the CSI-Report Config is indicated by radio resource control (radio resource control, RRC) signaling report Config Type, and the parameter may be set to be periodic (periodic), semi-persistent (semi-persistent), or aperiodic (aperiodic). For a periodic or semi-persistent report, a configured period value and a slot offset (slot offset) are numerology (numerology) where a current active uplink bandwidth part (active UL BWP) is applied. A high-layer parameter Report Quantity indicates CSI-related (CSI-related) or L1-RSRP-related (L1-RSRP-related) quantity that is used for reporting. A parameter Report Freq Configuration indicates the frequency granularity of a report, including CSI reporting band (CSI reporting band) and whether PMI/CQI reporting (reporting) is a wideband (wideband) or a sub-band (sub-band). The parameter CSI-Report Config may further include time restriction for channel measurements (configuration of time domain restriction to enable channel measurement) and time restriction for interference measurements (configuration of time domain restriction to enable interference measurement). The CSI-Report Config may further include Code book Config, including configuration parameters of Type-I or Type II CSI (including codebook subset restriction) and configuration of group based reporting (group based reporting).

For a beam report, a Report Quantity is required to be set to "CRI/RSRP" or "SSBRI/RSRP", indicating that a terminal obtains L1-RSRP of each beam by measuring CSI-RS or SSB resource configured by a network side device, and reports it to the network side device.

For a periodic beam report, RRC is used to configure a period, a slot offset, and a symbol in the slot that are of the report. The terminal feeds back the beam report based on the RRC configuration information. The beam report is transmitted on a short (short)/long (long) physical uplink control channel (Physical Uplink Control Channel, PUCCH).

For a semi-persistent beam report, RRC is used to configure a period, a slot offset, and a symbol in the slot that are of the report. For a semi-persistent report sent by using the short/long PUCCH, a media access control (Media Access Control, MAC) control element (Control Element, CE) is activated/deactivated. For a semi-persistent report sent by using the physical uplink control channel (Physical Uplink Control Channel, PUCCH), it is activated/deactivated by using downlink control information (Downlink Control Information, DCI).

For an aperiodic beam report, RRC is used to configure a slot offset, and a symbol in the slot that are of the report, and then the aperiodic beam report is triggered by using DCI. When the aperiodic beam report is triggered, the terminal may be triggered to feed back a plurality of reports of component carriers (component carrier, CC) or a plurality of types of reports (such as beam reports and CSI reports) at a time. The aperiodic beam report is transmitted on the PUSCH.

In the related technologies, for periodic and semi-persistent beam reports, once a network side device is configured with report-related information, a terminal needs to perform periodical reporting (for semi-persistent beam reports, it is reported periodically after the MAC CE is activated); and for aperiodic beam reports, a plurality of reports may also be reported based on the trigger of the network side device. However, when the state of the terminal does not change (for example, static) or has few changes (for example, moving speed is very low), beam measurement results of the terminal do not change, and then reporting of a beam report at this time will result in resource waste and is not conducive to power saving of the terminal.

To resolve the foregoing problems, embodiments of the present disclosure propose a method for information processing that uses different methods to report beam reports and/or CSI reports that are configured with different time domain behaviors, so as to reduce overhead and save communication resources.

Figure 1:
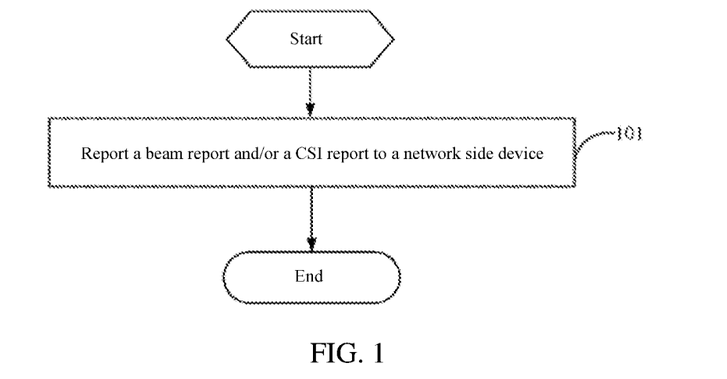
FIG. 1 is a first flowchart of a method for information processing according to an embodiment of the present disclosure.

Referring to FIG. 1, FIG. 1 is a flowchart of a method for information processing according to an embodiment of the present disclosure. As shown in FIG. 1, the method includes the following steps:

Step 101: Report a beam report and/or a CSI report to a network side device.

In this step, the beam report and/or the CSI report is reported in a case that time domain behavior of the beam report and/or the CSI report is a periodic report or a semi-persistent report and a reporting condition is met; or the beam report and/or the CSI report is reported in a case that time domain behavior of the beam report and/or the CSI report is an aperiodic report, where a quantity of reported beam reports is less than a quantity of beam reports that are configured by the network side device or triggered to report, and/or a quantity of reported CSI reports is less than a quantity of CSI reports that are configured by the network side device or triggered to report.

In this step, the reporting condition includes, but is not limited to: information on a reporting trigger event, that a periodic report or a semi-persistent report is enabled or disabled, a plurality of reporting periods of the periodic report, a plurality of reporting periods of the semi-persistent report, and the like.

In this embodiment of the present disclosure, the foregoing method may be applied to a terminal, such as: a mobile phone, a tablet computer (Tablet Computer), a laptop computer (Laptop Computer), a personal digital assistant (personal digital assistant, PDA), a mobile Internet device (Mobile Internet Device, MID), or a wearable device (Wearable Device).

It may be learned from the foregoing that, the terminal uses different methods to report the beam report and/or the CSI report to the network side device under different time domain behaviors, thereby saving communication resources.

In combination with different time domain behaviors and different reporting conditions, the implementation process of the method for information processing in this embodiment of the present disclosure will be described below in detail.

First, the time domain behavior of the beam report and/or the CSI report is a periodic report or a semi-persistent report and the reporting condition is the information on the reporting trigger event. This case can also be referred to as an event-based report.

(1) The terminal may report the beam report and/or the CSI report or stop reporting the beam report and/or the CSI report when it is detected that the reporting trigger event has occurred.

Step 101 is specifically as follows: In a case that the time domain behavior of the beam report and/or the CSI report is a periodic report or a semi-persistent report and the reporting trigger event occurs, report the beam report and/or the CSI report to the network side device or stop reporting the beam report and/or the CSI report to the network side device.

Because the reporting trigger event may include a plurality of types, the terminal can either report the beam report and/or the CSI report or stop reporting the beam report and/or the CSI report when the reporting trigger event has occurred.

For example, when an optimal beam identifier (CRI or SSBRI) that needs to be reported changes, the terminal performs reporting; otherwise, it stops reporting. For another example, when L1-RSRP change corresponding to the beam identifier that needs to be reported reaches a certain preset threshold, the terminal performs reporting; otherwise, it stops reporting.

(2) The network side device informs the terminal whether to enable an event-based report. That is, the terminal determines whether to report the beam report and/or the CSI report based on the notification of the network side device and whether the reporting trigger event occurs.

In this case, before Step 101, the method may further include:

receiving first information from the network side device, where the first information is used to indicate whether to enable an event-based report.

Specifically, the terminal may receive the first information from the network side device by using any of the following ways:

receiving the first information from the network side device by using DCI;

receiving the first information from the network side device by using MAC CE; or receiving the first information from the network side device by using RRC.

The foregoing signaling may be 1 bit. For example, 1 means ON, that is, the event-based report is enabled; and 0 means OFF, that is, the event-based report is disabled.

At this time, Step 101 is specifically as follows: In a case that the time domain behavior of the beam report and/or the CSI report is a periodic report or a semi-persistent report, the first information is used to indicate that the event-based report is enabled, and the reporting trigger event occurs, reporting the beam report and/or the CSI report to the network side device or stopping reporting the beam report and/or the CSI report to the network side device; or in a case that the time domain behavior of the beam report and/or the CSI report is a periodic report or a semi-persistent report and the first information is used to indicate that the event-based report is disabled, reporting the beam report and/or the CSI report to the network side device.

The reporting trigger event may be configured by the network side device, or may be determined by the terminal itself, or may be preset.

For example, when the first information is used to indicate that the event-based report is enabled and an optimal beam identifier (CRI or SSBRI) that needs to be reported changes, the terminal performs reporting; otherwise, it stops reporting. For another example, when the first information is used to indicate that the event-based report is enabled and L1-RSRP change corresponding to the beam identifier that needs to be reported reaches a certain preset threshold, the terminal performs reporting; otherwise, it stops reporting. When the first information is used to indicate that the event-based report is disabled, the terminal performs reporting according to the information configured by the network side device.

Second, the time domain behavior of the beam report and/or the CSI report is a periodic report or a semi-persistent report and the reporting condition is: that the periodic report or the semi-persistent report is enabled or disabled.

(1) The terminal may stop reporting the beam report and/or the CSI report when it detects that the periodic report or the semi-persistent report is disabled.

At this time, Step 101 is specifically as follows: In a case that the time domain behavior of the beam report and/or the CSI report is a periodic report or a semi-persistent report and the periodic report or the semi-persistent report is disabled, stopping reporting the beam report and/or the CSI report to the network side device.

(2) The network side device informs the terminal whether to enable the periodic report or the semi-persistent report.

In this case, before Step 101, the method may further include:

receiving second information from the network side device, where the second information is used to indicate whether to enable the periodic report or the semi-persistent report.

Specifically, in a case that the time domain behavior of the beam report and/or the CSI report is a periodic report, the receiving the second information from the network side device includes: receiving the second information from the network side device by using DCI, receiving the second information from the network side device by using MAC CE, or receiving the second information from the network side device by using RRC. The foregoing signaling may be 1 bit. For example, 1 means ON, that is, the periodic report is enabled; and 0 means OFF, that is, the periodic report is disabled.

For example, when the terminal periodically reports the beam report, the network side device informs the terminal to disable the periodic beam report (for example, in a case that the content of the report is unchanged or has little change for a plurality of consecutive times, or the network side device needs to temporarily use resources of the periodic beam report for other purposes), at this time, the terminal stops reporting the beam report to the network side device; and for the disabled periodic beam, the network side device may also notify the terminal to enable the beam report.

In a case that the time domain behavior of the beam report and/or the CSI report is a semi-persistent report, the receiving second information from the network side device includes: receiving the second information from the network side device by using DCI. The foregoing signaling may be 1 bit. For example, 1 means ON, that is, the semi-persistent report is enabled; and 0 means OFF, that is, the semi-persistent report is disabled.

For example, when the terminal receives an MAC CE command to activate the semi-persistent beam report and periodically report the beam report, the network side device informs the terminal to disable the semi-persistent beam report, at this time, the terminal stops reporting the beam report to the network side device; and for the disabled semi-persistent beam, the network side device may also notify the terminal to enable the beam report.

In actual applications, the terminal may also be informed at the same time whether to enable or disable the periodic report or the semi-persistent report. 2 bits are used as an example, where one bit is used to indicate whether to enable the periodic report; and another bit is used to indicate whether to enable the semi-persistent report.

In actual applications, the terminal may also be informed at the same time whether to enable or disable the periodic report or the semi-persistent report and whether to enable or disable the event-based report. 2 bits are used as an example, where one bit is used to indicate whether to enable the periodic report or the semi-persistent report; and another bit is used to indicate whether to enable the event-based report.

Third, the time domain behavior of the beam report and/or the CSI report is a periodic report or a semi-persistent report, the reporting condition is a plurality of reporting periods of the periodic report, and/or the reporting condition includes a plurality of reporting periods of the semi-persistent report.

That is, in this case, the network side device is allowed to configure a plurality of period values for the periodic report and the semi-persistent report. In different periods, the terminal may send or not send the beam report and/or the CSI reports. The period values and whether the terminal sends the beam report and/or the CSI report in different periods may be determined by the terminal according to a preset rule or network configuration.

At this time, Step 101 is specifically as follows: In a case that the time domain behavior of the beam report and/or the CSI report is a periodic report, reporting the beam report and/or the CSI report to the network side device based on a first reporting period of the plurality of reporting periods of the periodic report, or in a case that the time domain behavior of the beam report and/or the CSI report is a semi-persistent report, reporting the beam report and/or the CSI report to the network side device based on a second reporting period of the plurality of reporting periods of the semi-persistent report.

A value of the first reporting period is greater than or equal to a first preset value, a value of the second reporting period is greater than or equal to a second preset value, the first preset value is greater than a minimum value of the plurality of reporting periods of the periodic report, and the second preset value is greater than a minimum value of the plurality of reporting periods of the semi-persistent report.

For example, in a case that the network side device configures two period values T1 and T2 for the periodic beam report, and T1>T2, then the terminal may report the beam report at the larger period T1, and the terminal may report the beam report according to the foregoing event-based reporting method at the smaller period T2 or does not perform reporting at the smaller period T2.

Fourth, in a case that the time domain behavior of the beam report and/or the CSI report is an aperiodic report, the terminal sends information to the network side device, and the information is used to indicate which reports the terminal has reported to the network side device.

The time domain behavior of the network side device configuring the beam report for the terminal is an aperiodic report, and the network side device triggers a plurality of reports (such as a plurality of CC reports, a plurality of types of reports, and the like) by using DCI. At this time, Step 101 is specifically as follows.

The terminal sends UCI to the network side device, where the UCI includes first indication information, and the first indication information is used to indicate information of a beam report reported to the network side device; or the terminal sends UCI to the network side device, where the UCI includes second indication information, and the second indication information is used to indicate information of a CSI report reported to the network side device.

That is, the terminal adds signaling bits in the UCI to indicate which reports are currently reported.

For example, the first indication information is a first bitmap, where in a case that a first bit of the first bitmap is a first preset value, it means that a report corresponding to the first bit is reported to the network side device, or in a case that a first bit of the first bitmap is a second preset value, it means that a report corresponding to the first bit is not reported to the network side device.

The second indication information is a second bitmap, where in a case that a second bit of the second bitmap is a third preset value, it means that a report corresponding to the second bit is reported to the network side device, or in a case that a second bit of the second bitmap is a fourth preset value, it means that a report corresponding to the second bit is not reported to the network side device.

The first indication information is located in an independent signaling field of the UCI, or the first indication information is located in an existing target signaling field of the UCI; and the second indication information is located in an independent signaling field of the UCI, or the second indication information is located in an existing target signaling field of the UCI.

The existing target signaling field of the UCI includes, but is not limited to, a signaling field in part 1 (a first part) of the CSI report.

The first bitmap is used as an example, a quantity of bits in the first bitmap is equal to a quantity of reports, and each bit successively corresponds to a report index (such as a CC index), where the correspondence may be a default index size order or a network configuration order. 1 for each bit indicates that a report corresponding to the bit has been reported, and 0 indicates that no report is reported. A newly added signaling bit may be placed outside the CSI report of the UCI or the newly added signaling bit may be placed in the part 1 of the CSI report. The newly added signaling bit may be separately coded and then sent to the network side device together with other UCI content. Alternatively, the newly added signaling bit is jointly coded with other UCI signaling, for example, it is jointly coded with the CSI report.

Fifth, in a case that the time domain behavior of the beam report and/or the CSI report is an aperiodic report, the network side device performs blind detection on the beam report and/or the CSI report that is reported by the terminal, and determines the beam report and/or the CSI report that are actually reported by the terminal.

It may be learned from the foregoing that, in this embodiment of the present disclosure, the network side device may dynamically control the reporting of the beam report and/or the CSI report or the terminal reports the beam report and/or the CSI report based on events, so that when a measurement result changes little, the terminal does not need to report the beam report and/or the CSI report, thereby saving resources and being conducive to power saving for the terminal.

Figure 2:
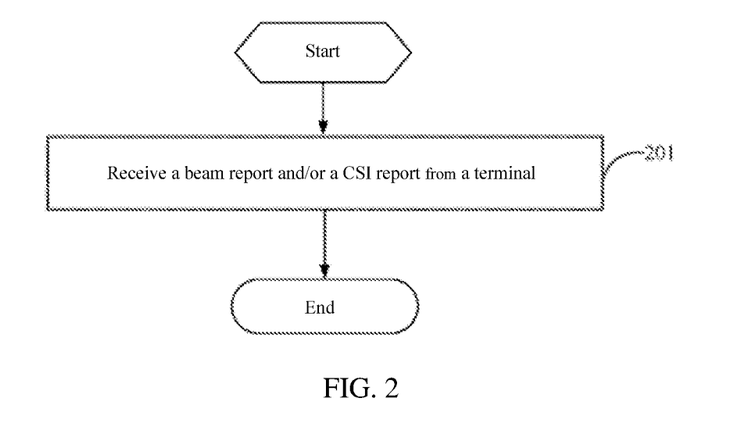
FIG. 2 is a second flowchart of a method for information processing according to an embodiment of the present disclosure.

Referring to FIG. 2, FIG. 2 is a flowchart of a method for information processing according to an embodiment of the present disclosure, where the method is applied to a network side device. As shown in FIG. 2, the method includes the following steps:

Step 201: Receive a beam report and/or a CSI report from a terminal.

The beam report and/or the CSI report is reported by the terminal in a case that time domain behavior of the beam report and/or the CSI report is a periodic report or a semi-persistent report and a reporting condition is met; or the beam report and/or the CSI report is reported by the terminal in a case that time domain behavior of the beam report and/or the CSI report is an aperiodic report, where a quantity of beam reports reported by the terminal is less than a quantity of beam reports that are configured by the network side device or triggered to report, and/or a quantity of CSI reports reported by the terminal is less than a quantity of CSI reports that are configured by the network side device or triggered to report.

It may be learned from the foregoing that, the terminal uses different methods to report the beam report and/or the CSI report to the network side device under different time domain behaviors, thereby saving communication resources.

To improve reporting efficiency and further save resources, when the beam report and/or the CSI report is reported by the terminal in a case that the time domain behavior of the beam report and/or the CSI report is a periodic report or a semi-persistent report and the reporting condition is met, before Step 201, the method further includes: sending first information to the terminal, where the first information is used to indicate whether to enable an event-based report.

Specifically, the network side device may send the first information to the terminal by using the following manners:

sending the first information to the terminal by using DCI; sending the first information to the terminal by using MAC CE; or sending the first information to the terminal by using RRC.

To improve reporting efficiency and further save resources, when the beam report and/or the CSI report is reported by the terminal in a case that the time domain behavior of the beam report and/or the CSI report is a periodic report or a semi-persistent report and the reporting condition is met, before Step 201, the method further includes:

sending, by the network side device, second information to the terminal, where the second information is used to indicate whether to enable a periodic report or a semi-persistent report.

Specifically, in a case that the time domain behavior of the beam report and/or the CSI report is a periodic report, the sending second information to the terminal includes:

sending the second information to the terminal by using DCI; sending the second information to the terminal by using MAC CE; or sending the second information to the terminal by using RRC.

In a case that the time domain behavior of the beam report and/or the CSI report is a semi-persistent report, the sending second information to the terminal includes: sending the second information to the terminal by using DCI.

To improve reporting efficiency and further save resources, when the beam report and/or the channel state information CSI report is reported by the terminal in a case that the time domain behavior of the beam report and/or the CSI report is a periodic report or a semi-persistent report and the reporting condition is met, before Step 201, the method further includes:

sending third information to the terminal, where the third information includes a plurality of reporting periods of the periodic report and/or a plurality of reporting periods of the semi-persistent report.

To further save resources, when the beam report and/or the CSI report is reported by the terminal in a case that the time domain behavior of the beam report and/or the CSI report is an aperiodic report, the method further includes:

receiving UCI from the terminal; determining the beam report and/or the CSI report that are actually reported by the terminal based on the UCI, where the UCI includes at least one of the following information: first indication information, where the first indication information is used to indicate information of the beam report reported by the terminal to the network side device; and second indication information, where the second indication information is used to indicate information of the CSI report reported by the terminal to the network side device.

To further save resources, when the beam report and/or the CSI report is reported by the terminal in a case that the time domain behavior of the beam report and/or the CSI report is an aperiodic report, the method further includes: performing blind detection on the beam report and/or the CSI report that is reported by the terminal, and determining the beam report and/or the CSI report that are actually reported by the terminal.

It may be learned from the foregoing that, in this embodiment of the present disclosure, the network side device may dynamically control the reporting of the beam report and/or the CSI report or the terminal reports the beam report and/or the CSI report based on events, so that when a measurement result changes little, the terminal does not need to report the beam report and/or the CSI report, thereby saving resources and being conducive to power saving for the terminal.

Figure 3:
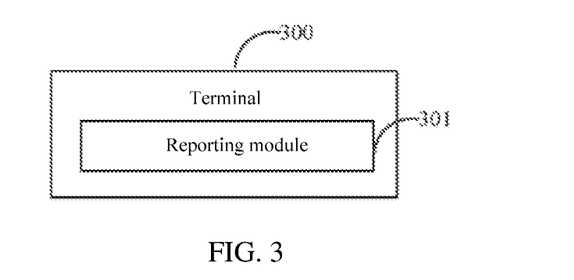
FIG. 3 is a first structural diagram of a terminal according to an embodiment of the present disclosure.

Referring to FIG. 3, FIG. 3 is a structural diagram of a terminal according to an embodiment of the present disclosure. As shown in FIG. 3, the terminal 300 includes:

a reporting module 301, configured to report a beam report and/or a channel state information CSI report to a network side device.

The beam report and/or the CSI report is reported in a case that time domain behavior of the beam report and/or the CSI report is a periodic report or a semi-persistent report and a reporting condition is met; or the beam report and/or the CSI report is reported in a case that time domain behavior of the beam report and/or the CSI report is an aperiodic report, where a quantity of reported beam reports is less than a quantity of beam reports that are configured by the network side device or triggered to report, and/or a quantity of reported CSI reports is less than a quantity of CSI reports that are configured by the network side device or triggered to report.

Optionally, the reporting condition includes information on a reporting trigger event. The reporting module is configured to:

in a case that the time domain behavior of the beam report and/or the CSI report is a periodic report or a semi-persistent report and the reporting trigger event occurs, report the beam report and/or the CSI report to the network side device or stop reporting the beam report and/or the CSI report to the network side device.

Optionally, the terminal may further include: a first receiving module, configured to, in a case that the time domain behavior of the beam report and/or the CSI report is a periodic report or a semi-persistent report, receive first information from the network side device, where the first information is used to indicate whether to enable an event-based report.

The reporting condition includes the information on the reporting trigger event. The reporting module is configured to: in a case that the time domain behavior of the beam report and/or the CSI report is a periodic report or a semi-persistent report, the first information is used to indicate that the event-based report is enabled, and the reporting trigger event occurs, report the beam report and/or the CSI report to the network side device or stop reporting the beam report and/or the CSI report to the network side device; or in a case that the time domain behavior of the beam report and/or the CSI report is a periodic report or a semi-persistent report and the first information is used to indicate that the event-based report is disabled, report the beam report and/or the CSI report to the network side device.

The first receiving module is specifically configured to receive the first information from the network side device by using DCI, receive the first information from the network side device by using MAC CE, or receive the first information from the network side device by using RRC.

Optionally, the reporting condition includes that a periodic report or a semi-persistent report is disabled. The reporting module is configured to:

in a case that the time domain behavior of the beam report and/or the CSI report is a periodic report or a semi-persistent report and the periodic report or the semi-persistent report is disabled, stop reporting the beam report and/or the CSI report to the network side device.

Optionally, the terminal may further include: a second receiving module, configured to receive second information from the network side device, where the second information is used to indicate whether to enable the periodic report or the semi-persistent report. The reporting module is configured to: in a case that the time domain behavior of the beam report and/or the CSI report is a periodic report or a semi-persistent report, and the second information is used to indicate that the periodic report or the semi-persistent report is disabled, stop reporting the beam report and/or the CSI report to the network side device; or in a case that the time domain behavior of the beam report and/or the CSI report is a periodic report or a semi-persistent report and the second information is used to indicate that the periodic report or the semi-persistent report is enabled, report the beam report and/or the CSI report to the network side device.

The second receiving module is specifically configured to: in a case that the time domain behavior of the beam report and/or the CSI report is a periodic report, receive the second information from the network side device by using DCI, receive the second information from the network side device by using MAC CE, or receive the second information from the network side device by using RRC; or in a case that the time domain behavior of the beam report and/or the CSI report is a semi-persistent report, receive the second information from the network side device by using DCI.

Optionally, the reporting condition includes a plurality of reporting periods of the periodic report, and/or the reporting condition includes a plurality of reporting periods of the semi-persistent report. The reporting module is configured to: in a case that the time domain behavior of the beam report and/or the CSI report is a periodic report, report the beam report and/or the CSI report to the network side device based on a first reporting period of the plurality of reporting periods of the periodic report; or in a case that the time domain behavior of the beam report and/or the CSI report is a semi-persistent report, report the beam report and/or the CSI report to the network side device based on a second reporting period of the plurality of reporting periods of the semi-persistent report. A value of the first reporting period is greater than or equal to a first preset value, a value of the second reporting period is greater than or equal to a second preset value, the first preset value is greater than a minimum value of the plurality of reporting periods of the periodic report, and the second preset value is greater than a minimum value of the plurality of reporting periods of the semi-persistent report.

Optionally, the terminal may further include: a sending module, configured to perform at least one of the following steps:

sending uplink control information (uplink control information, UCI) to the network side device, where the UCI includes first indication information, and the first indication information is used to indicate information of a beam report reported to the network side device; or sending UCI to the network side device, where the UCI includes second indication information, and the second indication information is used to indicate information of a CSI report reported to the network side device.

The first indication information is a first bitmap, where in a case that a first bit of the first bitmap is a first preset value, it means that a report corresponding to the first bit is reported to the network side device, or in a case that a first bit of the first bitmap is a second preset value, it means that a report corresponding to the first bit is not reported to the network side device.

The second indication information is a second bitmap, where in a case that a second bit of the second bitmap is a third preset value, it means that a report corresponding to the second bit is reported to the network side device, or in a case that a second bit of the second bitmap is a fourth preset value, it means that a report corresponding to the second bit is not reported to the network side device.

The first indication information is located in an independent signaling field of the UCI, or the first indication information is located in an existing target signaling field of the UCI; and the second indication information is located in an independent signaling field of the UCI, or the second indication information is located in an existing target signaling field of the UCI.

In a case that the first indication information is located in the independent signaling field of the UCI, the first indication information is separately coded, or in a case that the first indication information is located in the existing target signaling field of the UCI, the first indication information is jointly coded with the target signaling field. In a case that the second indication information is located in the independent signaling field of the UCI, the second indication information is separately coded, or in a case that the second indication information is located in the existing target signaling field of the UCI, the second indication information is jointly coded with the target signaling field.

The information processing terminal 300 may be a terminal or is located in a terminal.

The terminal 300 can implement the processes implemented by the terminal in the method embodiments of FIG. 1 to FIG. 2. To avoid repetition, details are not described herein again.

It may be learned from the foregoing that, in this embodiment of the present disclosure, the terminal uses different methods to report the beam report and/or the CSI report to the network side device under different time domain behaviors, thereby saving communication resources.

Figure 4:
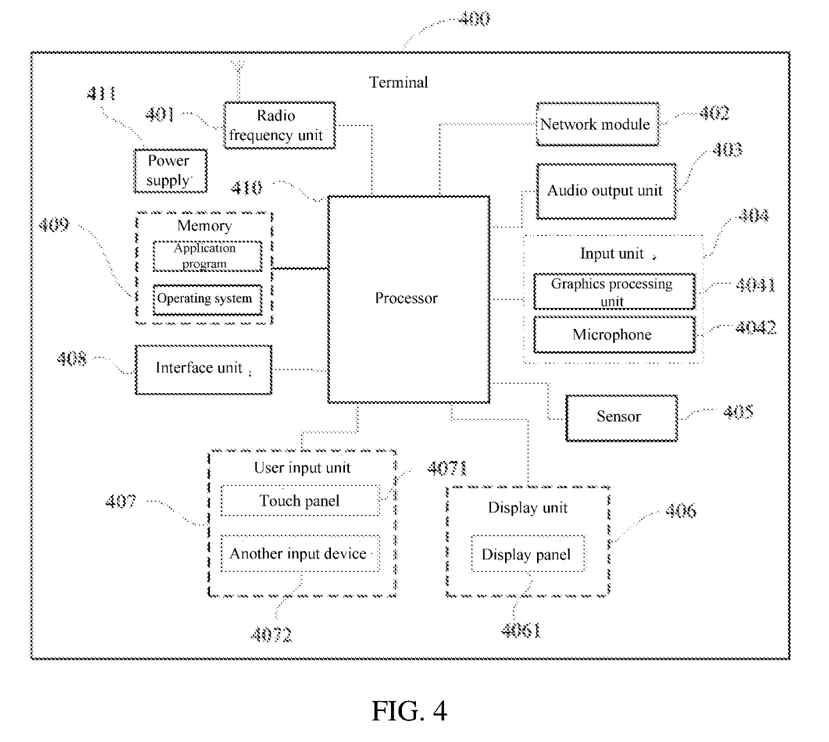
FIG. 4 is a second structural diagram of a terminal according to an embodiment of the present disclosure.

FIG. 4 is a schematic diagram of a hardware structure of a terminal according to an embodiment of the present disclosure. The terminal 400 includes, but is not limited to: a radio frequency unit 401, a network module 402, an audio output unit 403, an input unit 404, a sensor 405, a display unit 406, a user input unit 407, an interface unit 408, a memory 409, a processor 410, and a power supply 411. It can be understood by those skilled in the art that the structure of the terminal shown in FIG. 4 does not constitute a limitation on the terminal, and the terminal may include more or fewer components than those shown in the figure, or combine some components, or have different component arrangements. In the embodiments of this disclosure, the terminal includes, but is not limited to, a mobile phone, a tablet computer, a notebook computer, a palmtop computer, a vehicle-mounted terminal, a wearable device, a pedometer, or the like.

The processor 410 is configured to report a beam report and/or a channel state information CSI report to a network side device.

The beam report and/or the CSI report is reported in a case that time domain behavior of the beam report and/or the CSI report is a periodic report or a semi-persistent report and a reporting condition is met; or the beam report and/or the CSI report is reported in a case that time domain behavior of the beam report and/or the CSI report is an aperiodic report, where a quantity of reported beam reports is less than a quantity of beam reports that are configured by the network side device or triggered to report, and/or a quantity of reported CSI reports is less than a quantity of CSI reports that are configured by the network side device or triggered to report.

It may be learned from the foregoing that, in this embodiment of the present disclosure, the terminal uses different methods to report the beam report and/or the CSI report to the network side device under different time domain behaviors, thereby saving communication resources.

The reporting condition includes information on a reporting trigger event. The processor 410 is configured to: in a case that the time domain behavior of the beam report and/or the CSI report is a periodic report or a semi-persistent report and the reporting trigger event occurs, report the beam report and/or the CSI report to the network side device or stop reporting the beam report and/or the CSI report to the network side device.

The processor 410 is configured to: in a case that the time domain behavior of the beam report and/or the CSI report is a periodic report or a semi-persistent report, receive first information from the network side device, where the first information is used to indicate whether to enable an event-based report.

The reporting condition includes information on a reporting trigger event. The processor 410 is configured to: in a case that the time domain behavior of the beam report and/or the CSI report is a periodic report or a semi-persistent report, the first information is used to indicate that the event-based report is enabled, and the reporting trigger event occurs, report the beam report and/or the CSI report to the network side device or stop reporting the beam report and/or the CSI report to the network side device; or in a case that the time domain behavior of the beam report and/or the CSI report is a periodic report or a semi-persistent report and the first information is used to indicate that the event-based report is disabled, report the beam report and/or the CSI report to the network side device.

The processor 410 is configured to receive the first information from the network side device by using DCI, receive the first information from the network side device by using MAC CE, or receive the first information from the network side device by using RRC.

The reporting condition includes that a periodic report or a semi-persistent report is disabled. The processor 410 is configured to: in a case that the time domain behavior of the beam report and/or the CSI report is a periodic report or a semi-persistent report and the periodic report or the semi-persistent report is disabled, stop reporting the beam report and/or the CSI report to the network side device.

The processor 410 is configured to receive second information from the network side device, where the second information is used to indicate whether to enable a periodic report or a semi-persistent report.

The processor 410 is configured to: in a case that the time domain behavior of the beam report and/or the CSI report is a periodic report or a semi-persistent report, and the second information is used to indicate that the periodic report or the semi-persistent report is disabled, stop reporting the beam report and/or the CSI report to the network side device; or in a case that the time domain behavior of the beam report and/or the CSI report is a periodic report or a semi-persistent report and the second information is used to indicate that the periodic report or the semi-persistent report is enabled, report the beam report and/or the CSI report to the network side device.

The processor 410 is configured to: in a case that the time domain behavior of the beam report and/or the CSI report is a periodic report, receive the second information from the network side device by using DCI, receive the second information from the network side device by using MAC CE, or receive the second information from the network side device by using RRC.

The processor 410 is configured to: in a case that the time domain behavior of the beam report and/or the CSI report is a semi-persistent report, receive the second information from the network side device by using DCI.

The reporting condition includes a plurality of reporting periods of the periodic report, and/or the reporting condition includes a plurality of reporting periods of the semi-persistent report. The processor 410 is configured to: in a case that the time domain behavior of the beam report and/or the CSI report is a periodic report, report the beam report and/or the CSI report to the network side device based on a first reporting period of the plurality of reporting periods of the periodic report; or in a case that the time domain behavior of the beam report and/or the CSI report is a semi-persistent report, report the beam report and/or the CSI report to the network side device based on a second reporting period of the plurality of reporting periods of the semi-persistent report. A value of the first reporting period is greater than or equal to a first preset value, a value of the second reporting period is greater than or equal to a second preset value, the first preset value is greater than a minimum value of the plurality of reporting periods of the periodic report, and the second preset value is greater than a minimum value of the plurality of reporting periods of the semi-persistent report.

The processor 410 is configured to perform at least one of following steps:

sending uplink control information (uplink control information, UCI) to the network side device, where the UCI includes first indication information, and the first indication information is used to indicate information of a beam report reported to the network side device; or sending UCI to the network side device, where the UCI includes second indication information, and the second indication information is used to indicate information of a CSI report reported to the network side device.

The first indication information is a first bitmap, where in a case that a first bit of the first bitmap is a first preset value, it means that a report corresponding to the first bit is reported to the network side device, or in a case that a first bit of the first bitmap is a second preset value, it means that a report corresponding to the first bit is not reported to the network side device.

The second indication information is a second bitmap, where in a case that a second bit of the second bitmap is a third preset value, it means that a report corresponding to the second bit is reported to the network side device, or in a case that a second bit of the second bitmap is a fourth preset value, it means that a report corresponding to the second bit is not reported to the network side device.

The first indication information is located in an independent signaling field of the UCI, or the first indication information is located in an existing target signaling field of the UCI; and the second indication information is located in the independent signaling field of the UCI, or the second indication information is located in the existing target signaling field of the UCI.

In a case that the first indication information is located in the independent signaling field of the UCI, the first indication information is separately coded, or in a case that the first indication information is located in the existing target signaling field of the UCI, the first indication information is jointly coded with the target signaling field; or in a case that the second indication information is located in the independent signaling field of the UCI, the second indication information is separately coded, or in a case that the second indication information is located in the existing target signaling field of the UCI, the second indication information is jointly coded with the target signaling field.

It should be understood that, in this embodiment of the present disclosure, the radio frequency unit 401 can be configured to transmit and receive information, or transmit or receive signals during communication. Specifically, after receiving downlink data from a base station, the radio frequency unit sends the downlink data to the processor 410 for processing. In addition, the radio frequency unit sends the uplink data to the base station. Generally, the radio frequency unit 401 includes but is not limited to an antenna, at least one amplifier, a transceiver, a coupler, a low noise amplifier, and a duplexer. In addition, the radio frequency unit 401 may further communicate with a network and another device through wireless communication.

The terminal provides wireless broadband Internet access to a user through the network module 402, for example, helps the user receive and send e-mails, browse web pages, and access streaming media.

The audio output unit 403 may convert, into an audio signal, audio data received by the radio frequency unit 401 or the network module 402 or stored in the memory 409, and output the audio signal as sound. Moreover, the audio output unit 403 may further provide audio output (for example, call signal receiving sound and message receiving sound) related to a specific function performed by the terminal 400. The audio output unit 403 includes a speaker, a buzzer, a telephone receiver, and the like.

The input unit 404 is configured to receive an audio signal or a video signal. The input unit 404 may include a graphics processing unit (Graphics Processing Unit, GPU) 4041 and a microphone 4042. The graphics processing unit 4041 processes image data of a static image or video obtained by an image capture apparatus (such as, a camera) in a video capture mode or an image capture mode. A processed image frame may be displayed on the display unit 406. The image frame processed by the graphics processing unit 4041 may be stored in the memory 409 (or another storage medium) or sent through the radio frequency unit 401 or the network module 402. The microphone 4042 can receive sound and can process such sound into audio data. The processed audio data may be converted in a telephone call mode into a format that can be sent by the radio frequency unit 401 to a mobile communications base station for output.

The terminal 400 further includes at least one sensor 405, for example, a light sensor, a motion sensor, and other sensors. Specifically, the light sensor includes an ambient light sensor and a proximity sensor. The ambient light sensor can adjust a brightness of a display panel 4061 based on a brightness of ambient light. The proximity sensor can close the display panel 4061 and/or backlight when the terminal 400 moves to an ear. As a type of the motion sensor, an accelerometer sensor may detect an acceleration in each direction (generally, three axes), and detect a value and a direction of gravity when the accelerometer sensor is static, and may be used to recognize a terminal posture (such as screen switching between landscape and portrait modes, a related game, or magnetometer posture calibration), a function related to vibration recognition (such as a pedometer or a knock), and the like. The sensor 405 may further include a fingerprint sensor, a pressure sensor, an iris sensor, a molecular sensor, a gyroscope, a barometer, a hygrometer, a thermometer, and an infrared sensor. Details are not described herein.

The display unit 406 is configured to display information input by a user or information provided for a user. The display unit 406 may include a display panel 4061, and the display panel 4061 may be configured in a form of liquid crystal display (liquid crystal display, LCD), organic light-emitting diode (organic light-emitting diode, OLED), or the like.

The user input unit 407 may be configured to receive inputted digit or character information and generate key signal input related to user setting and function control of the terminal. Specifically, the user input unit 407 includes a touch panel 4071 and another input device 4072. The touch panel 4071 is also referred to as a touch screen, and may collect a touch operation performed by the user on or near the touch panel 4071 (such as an operation performed by the user on the touch panel 4071 or near the touch panel 4071 by using any proper object or accessory such as a finger or a stylus). The touch panel 4071 can include two parts: a touch detection device and a touch controller. The touch detection apparatus detects a touch position of the user, detects a signal brought by the touch operation, and sends the signal to the touch controller. The touch controller receives touch information from the touch detection apparatus, converts the touch information into touch point coordinates, sends the touch point coordinates to a processor 410, and receives and executes a command sent by the processor 410. In addition, the touch panel 4071 can be implemented by using multiple types such as a resistance type, a capacitance type, infrared rays, and surface acoustic waves. In addition to the touch panel 4071, the user input unit 407 may also include the another input device 4072. Specifically, the another input device 4072 may include, but is not limited to, a physical keyboard, functional keys (for example, a volume control key and a switch key), a trackball, a mouse, and a joystick. Details are not described herein.

Further, the touch panel 4071 can be superposed on the display panel 4061. When the touch panel 4071 detects touch operations thereon or nearby, the touch panel 4071 transmits the touch operations to the processor 410 to determine the type of a touch event. Subsequently, the processor 410 provides corresponding visual output on the display panel 4061 according to the type of the touch event. In FIG. 4, the touch panel 4071 and the display panel 4061 are used as two independent components to implement input and output functions of the terminal. However, in some embodiments, the touch panel 4071 and the display panel 4061 may be integrated to implement the input and output functions of the terminal. This is not specifically limited herein.

The interface unit 408 is an interface connecting an external apparatus to the terminal 400. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, and a headset port. The interface unit 408 may be configured to receive input (for example, data information and power) from an external apparatus and transmit the received input to one or more elements within the terminal 400, or may be configured to transmit data between the terminal 400 and the external apparatus.

The memory 409 may be configured to store software programs and various data. The memory 409 may mainly include a program storage area and a data storage area. The program storage area may store an operating system, an application program required by at least one function (such as a voice playing function and an image playing function), and the like, and the data storage area may store data (such as audio data and a phone book) created based on use of the mobile phone, and the like. In addition, the memory 409 may include a high-speed random access memory, and may also include a non-volatile memory, such as at least one disk storage device, a flash memory device, or other volatile solid-state memory devices.

The processor 410 is a control center of the terminal. The processor 410 uses various interfaces and lines to connect the various parts of the entire terminal, and performs various functions of the terminal and processes data by running or executing software programs and/or modules stored in the memory 409 and invoking data stored in the memory 409, to monitor the terminal as a whole. The processor 410 may include one or more processing units. Optionally, the processor 410 may be integrated with an application processor and a modem processor. The application processor mainly processes the operating system, the user interface, applications, and the like. The modem processor mainly processes wireless communication. It may be understood that alternatively, the modem processor may not be integrated into the processor 410.

The terminal 400 may also include a power supply 411 (for example, a battery) that supplies power to various components. Optionally, the power supply 411 may be logically connected to the processor 410 through a power supply management system, to perform functions of managing charging, discharging, and power consumption through the power supply management system.

In addition, the terminal 400 includes some function modules not shown. Details are not described herein.

Figure 5:
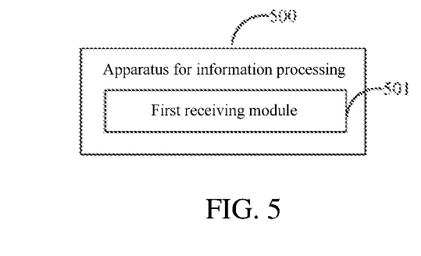
FIG. 5 is a first structural diagram of an apparatus for information processing according to an embodiment of the present disclosure.

As shown in FIG. 5, an apparatus for information processing 500 according to an embodiment of the present disclosure includes:

a first receiving module 501, configured to receive a beam report and/or a CSI report from a terminal.

The beam report and/or the CSI report is reported by the terminal in a case that time domain behavior of the beam report and/or the CSI report is a periodic report or a semi-persistent report and a reporting condition is met; or the beam report and/or the CSI report is reported by the terminal in a case that time domain behavior of the beam report and/or the CSI report is an aperiodic report, where a quantity of beam reports reported by the terminal is less than a quantity of beam reports that are configured by the network side device or triggered to report, and/or a quantity of CSI reports reported by the terminal is less than a quantity of CSI reports that are configured by the network side device or triggered to report.

Optionally, the apparatus may further include: a first sending module, configured to: when the beam report and/or the CSI report is reported by the terminal in a case that the time domain behavior of the beam report and/or the CSI report is a periodic report or a semi-persistent report and the reporting condition is met, send first information to the terminal, where the first information is used to indicate whether to enable an event-based report. Specifically, the first sending module is configured to send the first information to the terminal by using DCI, send the first information to the terminal by using MAC CE, or send the first information to the terminal by using RRC.

Optionally, the apparatus may further include: a second sending module, configured to: when the beam report and/or the CSI report is reported by the terminal in a case that the time domain behavior of the beam report and/or the CSI report is a periodic report or a semi-persistent report and the reporting condition is met, send second information to the terminal, where the second information is used to indicate whether to enable the periodic report or the semi-persistent report. Specifically, the second sending module is configured to: in a case that the time domain behavior of the beam report and/or the CSI report is a periodic report, send the second information to the terminal by using DCI, send the second information to the terminal by using MAC CE, or send the second information to the terminal by using RRC; or in a case that the time domain behavior of the beam report and/or the CSI report is a semi-persistent report, send the second information to the terminal by using DCI.

Optionally, the apparatus may further include: a third sending module, configured to: when the beam report and/or the CSI report is reported by the terminal in a case that the time domain behavior of the beam report and/or the CSI report is a periodic report or a semi-persistent report and the reporting condition is met, send third information to the terminal, where the third information includes a plurality of reporting periods of the periodic report, and/or a plurality of reporting periods of the semi-persistent report.

Optionally, the apparatus may further include: a second receiving module, configured to: when the beam report and/or the CSI report is reported by the terminal in a case that the time domain behavior of the beam report and/or the CSI report is an aperiodic report, receive UCI from the terminal; and determine the beam report and/or the CSI report that are actually reported by the terminal based on the UCI, where the UCI includes at least one of the following information: first indication information, where the first indication information is used to indicate information of the beam report reported by the terminal to the network side device; and second indication information, where the second indication information is used to indicate information of the CSI report reported by the terminal to the network side device.

Optionally, the apparatus may further include: a detection module, configured to: when the beam report and/or the CSI report is reported by the terminal in a case that the time domain behavior of the beam report and/or the CSI report is an aperiodic report, receive UCI from the terminal, perform blind detection on the beam report and/or the CSI report that is reported by the terminal, and determine the beam report and/or the CSI report that are actually reported by the terminal.

The apparatus for information processing 500 can implement the processes implemented by the apparatus for information processing in the method embodiments of FIG. 1 to FIG. 2. To avoid repetition, details are not described herein again.

It may be learned from the foregoing that, in this embodiment of the present disclosure, the terminal uses different methods to report the beam report and/or the CSI report to the network side device under different time domain behaviors, thereby saving communication resources.

Optionally, an embodiment of the present disclosure further provides a communications device, including: a processor, a memory, and a computer program stored in the memory and executable on the processor. The computer program, when executed by the processor, implements processes in any one of the embodiments of the method for information processing, and the same technical effect can be achieved. To avoid repetition, details are not described herein again.

An embodiment of the present disclosure further provides a computer readable storage medium, where the computer readable storage medium stores a computer program. The computer program, when executed by a processor, implements processes in any one of the embodiments of the method for information processing, and the same technical effect can be achieved. To avoid repetition, details are not described herein again. The computer readable storage medium is, for example, a read-only memory (Read-Only Memory, ROM), a random access memory (Random Access Memory, RAM), a magnetic disk, or a compact disc.

It should be noted that, the terms "comprise", "include", or their any other variant in this specification are intended to cover a non-exclusive inclusion, so that a process, a method, an object, or an apparatus that includes a list of elements not only includes those elements but also includes other elements which are not expressly listed, or further includes elements inherent to such process, method, object, or apparatus. An element defined by "including a . . . " does not, without more constraints, preclude the existence of additional identical elements in the process, method, object, or apparatus that includes the element.

Based on the foregoing descriptions of the implementations, a person skilled in the art may clearly understand that the method in the foregoing embodiment may be implemented by software in addition to a necessary universal hardware platform or by hardware only. In most circumstances, the former is a preferred implementation. Based on such an understanding, the technical solutions of the present disclosure essentially or the part contributing to the prior art may be implemented in a form of a software product. The computer software product is stored in a readable storage medium (such as a ROM/RAM, a magnetic disk, or a compact disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the protection scope of aims of the present disclosure and claims, all of which fall within the protection of the present disclosure.

The invention claimed is:

1. A method for information processing, applied to a terminal, comprising:
reporting a beam report to a network side device, wherein
the beam report is reported in a case that time domain behavior of the beam report is a periodic report or a semi-persistent report and a reporting condition is met; or
the beam report is reported in a case that time domain behavior of the beam report is an aperiodic report, wherein a quantity of reported beam reports is less than a quantity of beam reports that are configured by the network side device or triggered by the network side device to report;
wherein the reporting condition comprises that a periodic report or a semi-persistent report is disabled; and
the reporting a beam report to a network side device comprises:
in a case that the time domain behavior of the beam report is a periodic report or a semi-persistent report and the periodic report or the semi-persistent report is disabled, stopping reporting the beam report to the network side device;
wherein the reporting condition comprises a plurality of reporting periods of the periodic report, and/or the reporting condition comprises a plurality of reporting periods of the semi-persistent report; and
the reporting a beam report to a network side device comprises:
in a case that the time domain behavior of the beam report is a periodic report, reporting the beam report to the network side device based on a first reporting period of the plurality of reporting periods of the periodic report; or in a case that the time domain behavior of the beam report is a semi-persistent report, reporting the beam report to the network side device based on a second reporting period of the plurality of reporting periods of the semi-persistent report, wherein a value of the first reporting period is greater than or equal to a first preset value, a value of the second reporting period is greater than or equal to a second preset value, the first preset value is greater than a minimum value of the plurality of reporting periods of the periodic report, and the second preset value is greater than a minimum value of the plurality of reporting periods of the semi-persistent report.

2. The method according to claim 1, wherein before the reporting a beam report to a network side device, the method further comprises:

receiving second information from the network side device, wherein the second information is used to indicate whether to enable the periodic report or the semi-persistent report.

3. The method according to claim 2, wherein the reporting a beam report to a network side device comprises:

in a case that the time domain behavior of the beam report is a periodic report or a semi-persistent report and the second information is used to indicate that the periodic report or the semi-persistent report is disabled, stopping reporting the beam report to the network side device; or in a case that the time domain behavior of the beam report is a periodic report or a semi-persistent report and the second information is used to indicate that the periodic report or the semi-persistent report is enabled, reporting the beam report to the network side device.

4. The method according to claim 2, wherein in a case that the time domain behavior of the beam report is a periodic report, the receiving second information from the network side device comprises:

receiving the second information from the network side device by using DCI; receiving the second information from the network side device by using MAC CE; or receiving the second information from the network side device by using RRC; or in a case that the time domain behavior of the beam report is a semi-persistent report, the receiving second information from the network side device comprises:

receiving the second information from the network side device by using DCI.

5. The method according to claim 1, wherein in a case that the time domain behavior of the beam report is an aperiodic report, the method further comprises at least one of the following steps:

sending uplink control information (uplink control information, UCI) to the network side device, wherein the UCI comprises first indication information, and the first indication information is used to indicate information of a beam report reported to the network side device.

6. A terminal, comprising: a memory, a processor, and a computer program that is stored in the memory and capable of running on the processor, wherein the computer program is executed by the processor to implement:

reporting a beam report to a network side device, wherein the beam report is reported in a case that time domain behavior of the beam report is a periodic report or a semi-persistent report and a reporting condition is met; or the beam report is reported in a case that time domain behavior of the beam report is an aperiodic report, wherein a quantity of reported beam reports is less than a quantity of beam reports that are configured by the network side device or triggered by the network side device to report;

wherein the reporting condition comprises that a periodic report or a semi-persistent report is disabled; and the computer program is further executed by the processor to implement:

in a case that the time domain behavior of the beam report is a periodic report or a semi-persistent report and the periodic report or the semi-persistent report is disabled, stopping reporting the beam report to the network side device;

wherein the reporting condition comprises a plurality of reporting periods of the periodic report, and/or the reporting condition comprises a plurality of reporting periods of the semi-persistent report; and the computer program is further executed by the processor to implement:

in a case that the time domain behavior of the beam report is a periodic report, reporting the beam report to the network side device based on a first reporting period of the plurality of reporting periods of the periodic report; or in a case that the time domain behavior of the beam report is a semi-persistent report, reporting the beam report to the network side device based on a second reporting period of the plurality of reporting periods of the semi-persistent report, wherein a value of the first reporting period is greater than or equal to a first preset value, a value of the second reporting period is greater than or equal to a second preset value, the first preset value is greater than a minimum value of the plurality of reporting periods of the periodic report, and the second preset value is greater than a minimum value of the plurality of reporting periods of the semi-persistent report.

7. The terminal according to claim 6, wherein the computer program is further executed by the processor to implement:

receiving second information from the network side device, wherein the second information is used to indicate whether to enable the periodic report or the semi-persistent report.

8. The terminal according to claim 7, wherein the computer program is further executed by the processor to implement:

in a case that the time domain behavior of the beam report is a periodic report or a semi-persistent report and the second information is used to indicate that the periodic report or the semi-persistent report is disabled, stopping reporting the beam report to the network side device; or in a case that the time domain behavior of the beam report is a periodic report or a semi-persistent report and the second information is used to indicate that the periodic report or the semi-persistent report is enabled, reporting the beam report to the network side device.

9. The terminal according to claim 7, wherein in a case that the time domain behavior of the beam report is a periodic report, the computer program is further executed by the processor to implement: receiving the second information from the network side device by using DCI; receiving the second information from the network side device by using MAC CE; or receiving the second information from the network side device by using RRC; or wherein in a case that the time domain behavior of the beam report is a semi-persistent report, the computer program is further executed by the processor to implement: receiving the second information from the network side device by using DCI.

10. The terminal according to claim 6, wherein the computer program is further executed by the processor to implement:
in a case that the time domain behavior of the beam report is an aperiodic report, sending uplink control information (uplink control information, UCI) to the network side device, wherein the UCI comprises first indication information, and the first indication information is used to indicate information of a beam report reported to the network side device.

11. A non-transitory computer readable storage medium, wherein the computer readable storage medium stores a computer program, and the computer program, when executed by a processor, implements:
reporting a beam report to a network side device, wherein the beam report is reported in a case that time domain behavior of the beam report is a periodic report or a semi-persistent report and a reporting condition is met; or
the beam report is reported in a case that time domain behavior of the beam report is an aperiodic report, wherein a quantity of reported beam reports is less than a quantity of beam reports that are configured by the network side device or triggered by the network side device to report;
wherein the reporting condition comprises that a periodic report or a semi-persistent report is disabled; and the computer program, when executed by a processor, further implements:
in a case that the time domain behavior of the beam report is a periodic report or a semi-persistent report and the periodic report or the semi-persistent report is disabled, stopping reporting the beam report to the network side device;
wherein the reporting condition comprises a plurality of reporting periods of the periodic report, and/or the reporting condition comprises a plurality of reporting periods of the semi-persistent report; and the computer program, when executed by a processor, further implements:
in a case that the time domain behavior of the beam report is a periodic report, reporting the beam report to the network side device based on a first reporting period of the plurality of reporting periods of the periodic report; or
in a case that the time domain behavior of the beam report is a semi-persistent report, reporting the beam report to the network side device based on a second reporting period of the plurality of reporting periods of the semi-persistent report, wherein a value of the first reporting period is greater than or equal to a first preset value, a value of the second reporting period is greater than or equal to a second preset value, the first preset value is greater than a minimum value of the plurality of reporting periods of the periodic report, and the second preset value is greater than a minimum value of the plurality of reporting periods of the semi-persistent report.

12. The non-transitory computer readable storage medium according to claim 11, wherein the computer program, when executed by a processor, further implements:
receiving second information from the network side device, wherein the second information is used to indicate whether to enable the periodic report or the semi-persistent report.

13. The non-transitory computer readable storage medium according to claim 12, wherein the computer program, when executed by a processor, further implements:
in a case that the time domain behavior of the beam report is a periodic report or a semi-persistent report and the second information is used to indicate that the periodic report or the semi-persistent report is disabled, stopping reporting the beam report to the network side device; or
in a case that the time domain behavior of the beam report is a periodic report or a semi-persistent report and the second information is used to indicate that the periodic report or the semi-persistent report is enabled, reporting the beam report to the network side device.

14. The non-transitory computer readable storage medium according to claim 12, wherein in a case that the time domain behavior of the beam report is a periodic report, the computer program, when executed by a processor, further implements: receiving the second information from the network side device by using DCI; receiving the second information from the network side device by using MAC CE; or receiving the second information from the network side device by using RRC; or
wherein in a case that the time domain behavior of the beam report is a semi-persistent report, the computer program, when executed by a processor, further implements: receiving the second information from the network side device by using DCI.

15. The non-transitory computer readable storage medium according to claim 11, wherein the computer program, when executed by a processor, further implements:
in a case that the time domain behavior of the beam report is an aperiodic report, sending uplink control information (uplink control information, UCI) to the network side device, wherein the UCI comprises first indication information, and the first indication information is used to indicate information of a beam report reported to the network side device.

* * * * *